Δmv FROM ZENER
VOLTS AT T-MAX.

CORR. mV

CORR. mV

Δmv

United States Patent Office 3,443,202
Patented May 6, 1969

3,443,202
TEMPERATURE COMPENSATED TRANSISTORIZED POWER SUPPLY REGULATING MEANS
Clifford H. Moulton, Portland, Oreg., assignor to Allis-Chalmers Manufacturing Company, Milwaukee, Wis.
Filed May 16, 1966, Ser. No. 550,230
Int. Cl. G05f 1/56
U.S. Cl. 323—22         4 Claims

ABSTRACT OF THE DISCLOSURE

A power supply regulator having a power transistor between the input and output of the supply. A potentiometer samples the output voltage and a Zener diode provides a reference voltage. An error amplifier provides an error signal which is applied to the power transistor thru error signal amplifying transistors when the sampled output voltage varies from the reference voltage. The Zener diode is inherently temperature compensated to provide a maximum output at a given temperature which falls off above or below that temperature. A temperature sensitive resistor provides "end compensation" for the Zener diode. A temperature compensating diode compensates for temperature effecting the error signal amplifying transistors.

---

This invention relates generally to power supply regulating means and, particularly, to temperature compensated transistorized power supply regulating means.

The invention is employed to particular advantage in very sensitive apparatus such as transmission line current measuring or line protective equipment.

In accordance with the present invention, power supply regulating means, including temperature compensating means, are provided for power supplies.

It is an object of the present invention to provide improved power supply regulating means.

Another object is to provide such means which provide power so well regulated that revenue accuracy current measurements can be made under wide ambient temperature conditions.

Another object is to provide such means which incorporate improved means for providing temperature compensation of the electronic circuitry.

Other objects and advantages of the invention will hereinafter appear.

Figure 1:
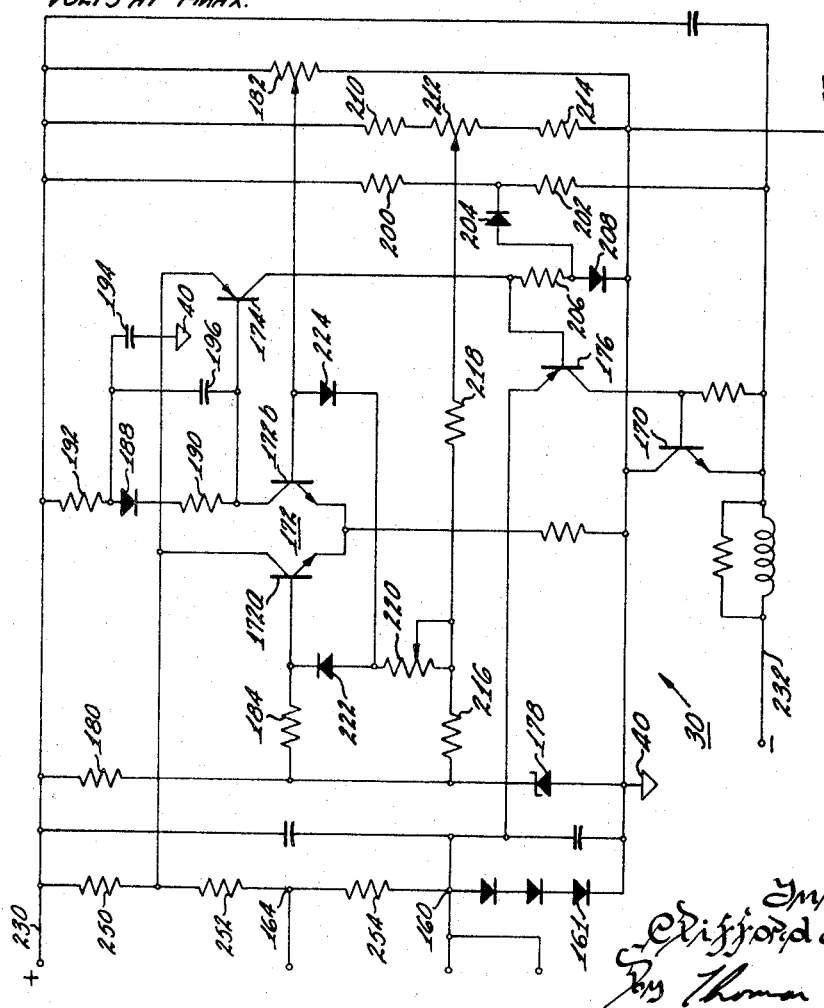
FIG. 1 is a schematic view of the circuitry of the present invention.

The power supply regulating circuit 30 shown in FIG. 1 is adapted to provide precisely controlled and regulated output from suitable power supplies which are adapted to be connected to a positive input terminal 230 and a negative input terminal 232 of regulating circuit 30.

Regulating circuit 30 is provided with output terminals 40 (which is ground) and 160 and 164. A voltage dividing network comprising resistors 250, 252 and 254 is connected between the terminals 230 and 40 in series with three diodes 161. The diodes 161 are provided as a protective means in the event that a load thereacross accidentally opens. Output terminal 160 has an output of 1.2 volts, for example. Output terminal 164 has a 12.6 volt output, for example.

It is to be noted that the voltage between terminals 40 and 230 is the voltage to be regulated. This is accomplished by controlling a power transistor 170 which has its emitter-collector circuit connected between terminals 232 and 40, respectively. The means for effecting control or regulation of transistor 170 comprises a dual chip NPN transistor 172 having two matched transistor elements 172a and 172b and which drives a PNP transistor 174. Transistor 174 drives a PNP transistor 176 which in turn drives or controls power transistor 170. Increasing or decreasing the base current of transistor 170 increases or decreases the voltage drop between the terminals 40 and 232. This maintains constant voltage between terminals 40 and 230 regardless of voltage changes between terminals 230 and 232 or load current changes between terminals 230 and 40.

A Zener diode 178 serves as the reference voltage for the regulated supply and is connected across terminals 40 and 230 through a resistor 180. Means are provided to compare a sample of the output voltage across terminals 40 and 230 with the reference voltage of the Zener diode 178. Such means comprise a potentiometer 182 which is connected across terminals 40 and 230 and has its tap connected to the base of transistor 172b for sampling purposes. The base of transistor 172a is connected to a point between Zener diode 178 and resistor 180 through a resistor 184. If the regulated voltage between the terminals 40 and 230 deviates from its desired value, an error signal appears at the collector of transistor 172b to drive the base of transistor 174 and causing the latter's collector to drive the base of transistor 176, thereby causing the latter's collector to control the base of power transistor 170. This effects a correction of the regulated output voltage between terminals 40 and 230.

One side of a diode 188 is connected through a resistor 190 to the collector of transistor 172b. The other side of diode 188 is connected through a resistor 192 to terminal 230. Diode 188 serves as a temperature compensating means to offset variations caused by temperature to which the base-emitter junction of transistor 174 is exposed. Capacitors 194 and 196 are provided to limit the frequency response of the network and improve its stability.

Means are provided to initiate operation of the power supply regulating circuit 30 when its power supply is first energized. Such means comprise resistors 200 and 202 which are connected in series across the terminals 230 and 232. A diode 204 is connected between resistors 200 and 202 on one side and has its other side connected through a resistor 206 to the base of transistor 176. When terminals 230 and 232 are first energized, diode 204 conducts to increase the base current of transistor 176 thereby turning on transistor 176, which in turn turns on transistor 170 causing energization of the entire circuit 30. A diode 208 is connected between point 40 and a point between resistor 206 and diode 204 to protect transistor 176 in the event of excessive transient voltage.

In practice, Zener diode 178 is provided with inherent temperature compensation and is rated at 10 parts per million per degree centigrade temperature coefficient.

Figure 2:
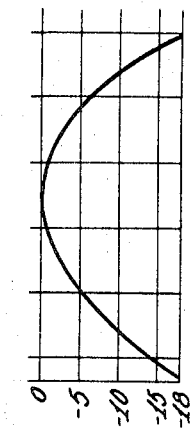
FIG. 2 is a graph depicting the normal operating characteristic of an inherently temperature compensated Zener diode employed in the temperature compensating portion power supply regulating means.

Accordingly, ambient temperature changes between −55° C. to +95° C. would result in errors greater than 0.1%. Regulating circuit 30 is designed to assure even greater accuracy by compensating for residual Zener voltage variations due to temperature. This reduces the voltage error by an additional factor of 10. Zener diode 178 may, for example, be a type MIL–1N994A diode which tends to attain a maximum output voltage at a temperature within the range of 40° C. above or below room temperature. Output voltage of Zener diode 178 falls off at the high and low temperature extremes, as FIG. 2 shows. A correction technique described as End Compensation as adopted for the extreme temperature ranges and has a separate adjustment technique for the "mid-temperature" characteristics of the particular Zener diode. Outside of the ends of a mid-temperature plateau, correction is increased linearly toward either extreme temperature.

A resistor network comprising a resistor 210, a potentiometer 212 and a temperature sensitive silicon resistor 214 (having a positive temperature coefficient) is connected between terminal 230 and point 40. Another resistor network comprising resistors 216 and 218 is connected between the anode of Zener diode 178 and the tap of potentiometer 212. A rheostat 220 is connected to a point between resistors 216 and 218 and to a point between a pair of steering diodes 222 and 224 which are connected to the bases of the transistors 172a and 172b.

Figure 3:
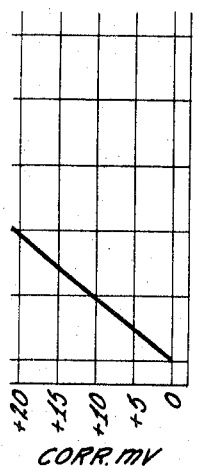
FIG. 3 is a graph depicting the normal operating characteristic of a temperature compensated silicon resistor employed in the temperature compensating portion of the power supply regulating means.
Figure 4:
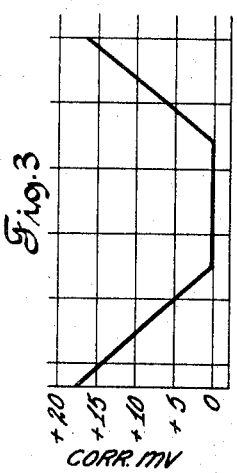
FIG. 4 is a graph depicting the correction curve resulting from the action of steering diodes on the characteristic of the resistor described in connection with FIG. 3.
Figure 5:
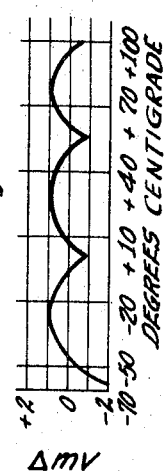
FIG. 5 is a graph depicting the reference voltage resulting from the cooperation of the Zener diode, the temperature compensated silicon resistor, and the steering diodes.
Figure 5:

Correction voltage is generated by a temperature-sensitive silicon resistor 214 which provides rising voltage with temperature in the range of 6 to 13 volts, for example, as FIG. 3 shows. The Zener diode 178 itself provides the reference voltage for one end of a divider consisting of resistors 216 and 218 in series. The silicon resistor 214 provides a reference voltage for the other end of the divider through potentiometer 212. Silicon diodes 222 and 224 steer the resulting temperature-variable signal from the resistor network 216 and 218 either through transistor 172a base or through transistor 172b base, as FIG. 4 shows. At high temperatures, one diode 224 couples a temperature correction current to the base of transistor 172b, bringing the power supply output back to the mid-temperature level. At a low temperature the opposite steering diode 222 introduces a temperature correcting current into the transistor 172a base so that output from the power supply is restored to the voltage at mid-temperature even with the lower Zener terminal voltage, as FIG. 5 shows.

Potentiometers 212 and 220 are factory adjustable to compensate for variation in the tolerances of Zener diode 178 and silicon resistor 214 and other components associated therewith. Potentiometer 212 superimposes the correction curve symmetrically over the temperature curve Zener diode 178. Rheostat 220 adjusts the slope of the ends of the correction curve. Resistor 184 isolates the correction signal from diode 222 from Zener diode 178.

The embodiments of the invention in which an exclusive property or privilege is claimed are defined as follows:

1. In a power supply regulator having a pair of input terminals and an output terminal,
    means for providing a reference voltage connected between one input terminal and said output terminal, said means for providing a reference voltage being inherently temperature compensated and exhibiting a maximum output at a predetermined temperature which declines on either side of said predetermined temperature,
    means for sampling the output voltage connected between said one input terminal and said output terminal,
    comparing means for comparing the sampled output voltage with said reference voltage and providing an error signal if a discrepancy exists,
    means connected between said output terminal and the other input terminal and responsive to said error signal to vary the voltage relationship between said output terminal and said other input terminal to regulate the voltage between said one input terminal and said output terminal, and
    temperature compensating means to provide end compensation for temperature changes affecting said means for providing a reference voltage.

2. A power supply regulator according to claim 1 wherein said temperature compensating means comprises a temperature compensating resistor connected between said one input terminal and said output terminal for affecting the error signal provided by the comparing means.

3. A power supply regulator according to claim 2 wherein said comparing means comprises a pair of transistors having their emitters connected in common, and wherein said temperature compensating means further comprises a pair of steering diodes connected in series between the bases of said transistors, and wherein a point between said steering diodes is connected to said reference voltage means and to said temperature compensating resistor.

4. A power supply regulator according to claim 3 wherein error signal amplifying means are connected between one of said transistors and said voltage regulating means and further comprising a temperature compensating element which is connected between said comparing means and said one input terminal to provide temperature compensation for said amplifying means.

References Cited

UNITED STATES PATENTS

| | | |
|---|---|---|
| 2,751,549 | 6/1956 | Chase. |
| 2,963,637 | 12/1960 | Osborn. |
| 3,099,791 | 7/1963 | Turner. |
| 3,103,617 | 9/1963 | Schneider et al. |
| 3,151,288 | 9/1964 | Avizienis et al. |
| 3,178,633 | 4/1965 | Slusher et al. |

JOHN F. COUCH, *Primary Examiner.*

A. D. PELLINEN, *Assistant Examiner.*

U.S. Cl. X.R.

307—297; 323—38; 69